(12) United States Patent

Huso et al.

(10) Patent No.: US 12,681,283 B2

(45) Date of Patent: Jul. 14, 2026

(54) SPECTROSCOPIC MICROSCOPE WITH CHANGEABLE OPTICS/COMPONENTS

(71) Applicant: Klar Scientific, Inc., Pullman, WA (US)

(72) Inventors: Jesse Huso, Pullman, WA (US); Richard Saul Lytel, Pullman, WA (US); Matthew Douglas McCluskey, Pullman, WA (US); Violet Mary Poole, Pullman, WA (US)

(73) Assignee: Klar Scientific, Inc., Pullman, WA (US)

( * ) Notice: Subject to any disclaimer, the term of this patent is extended or adjusted under 35 U.S.C. 154(b) by 866 days.

(21) Appl. No.: 17/844,970

(22) Filed: Jun. 21, 2022

(65) Prior Publication Data

US 2022/0413274 A1 Dec. 29, 2022

Related U.S. Application Data

(60) Provisional application No. 63/213,895, filed on Jun. 23, 2021.

(51) Int. Cl.
G02B 21/00 (2006.01)
G01N 21/31 (2006.01)
G02B 21/36 (2006.01)

(52) U.S. Cl.
CPC ......... G02B 21/0032 (2013.01); G01N 21/31 (2013.01); G02B 21/0064 (2013.01); G02B 21/0076 (2013.01); G02B 21/361 (2013.01)

(58) Field of Classification Search
CPC .............. G02B 21/0008; G02B 21/002; G02B 21/0032; G02B 21/16; G02B 21/0076; G02B 21/365; G01N 21/6452; G01N 21/64; G01N 21/65; G01N 21/6456; G01N 21/6458; G01N 21/6402; G01N 21/645; G01N 21/6428
See application file for complete search history.

(56) References Cited

U.S. PATENT DOCUMENTS

| | | | | |
|---|---|---|---|---|
| 6,056,409 | A * | 5/2000 | Grinblat ............... | G02B 21/362 359/503 |
| 2008/0265177 | A1* | 10/2008 | Connally ........... | G01N 21/6458 250/461.2 |
| 2010/0060883 | A1* | 3/2010 | Heiden .................... | G02B 7/32 356/126 |
| 2011/0032609 | A1* | 2/2011 | Stanley .............. | G02B 27/1073 359/388 |
| 2012/0050852 | A1* | 3/2012 | Angelini ................ | G02B 21/16 359/385 |
| 2013/0021665 | A1* | 1/2013 | Kubek ................. | G02B 21/248 359/394 |
| 2016/0061717 | A1* | 3/2016 | Bawolek .............. | G02B 21/088 356/402 |

(Continued)

*Primary Examiner* — Ephrem Z Mebrahtu

(74) *Attorney, Agent, or Firm* — WCF IP

(57) ABSTRACT

A modular microscope can quickly be modified for specific scanning applications. The microscope includes a microscope main body which has slots into which long pass filter modules, dichroic mirror modules, notch filter modules, and LED modules can be selectively placed, removed, and changed out. In some applications, the interchangeable components permit quickly changing between Photoluminescence (PL) and Raman spectroscopy (microscope) systems.

18 Claims, 11 Drawing Sheets

(56) References Cited

U.S. PATENT DOCUMENTS

| | | | |
|---|---|---|---|
| 2018/0313757 A1 * | 11/2018 | Rochford | G01N 21/6447 |
| 2018/0328786 A1 * | 11/2018 | Lambert | G01J 3/0208 |
| 2019/0170647 A1 * | 6/2019 | Ikenaga | A61B 1/0638 |
| 2020/0018942 A1 * | 1/2020 | Rochford | G02B 21/361 |
| 2021/0318245 A1 * | 10/2021 | Fang | G01J 3/4412 |

* cited by examiner

16

66

68

24

80

84

88

88

92

90

94

SPECTROSCOPIC MICROSCOPE WITH CHANGEABLE OPTICS/COMPONENTS

CROSS-REFERENCE TO RELATED APPLICATIONS

This application claims priority to U.S. Ser. No. 63/213,895 filed on Jun. 23, 2021, and the complete contents thereof is herein incorporated by reference.

FIELD OF THE INVENTION

The present embodiments herein relate to a spectroscopy system for imaging to, for example, interrogate defects and unknown substances. More particularly, some embodiments herein relate to a Photoluminescence (PL) and Raman spectroscopy (microscope) system having novel modular interchangeable component and assembly arrangements.

BACKGROUND OF THE INVENTION

Discussion of the Related Art

Photoluminescence (PL) and Raman spectroscopy are important techniques for evaluating materials, finding defects, and identifying unknown substances. The present beneficial example PL/Raman microscope system disclosed herein focuses laser light through an objective lens onto a sample. Light emitted by the sample is collected by an optical fiber and delivered to a spectrometer. A light emitting diode (LED) and camera are also provided for widefield imaging required for basic sample inspection and identifying regions of interest.

BRIEF SUMMARY OF THE DISCLOSURE

In a first aspect, the invention herein is directed to a Photoluminescence (PL) and Raman spectroscopy (microscope) system having novel modular interchangeable component and assembly arrangements.

Another beneficial aspect can include a spectroscopic microscope kit that generally includes a laser source; a removably coupled module for the laser source; a filter assembly for filtering a source emission; a main body for directing optical information of the spectroscopic microscope, wherein the main body includes a removable objective lens to focus the laser source onto a sample and collect light emitted from the sample and a removable dichroic module to reflect the laser onto the sample and transmit emitted light to the filter assembly, and dichroic module; a removable long pass module to reject the laser source; and a removable fiber assembly to transfer light to the spectroscopic microscope.

DETAILED DESCRIPTION OF THE INVENTION

Specific Description

Figure 1:
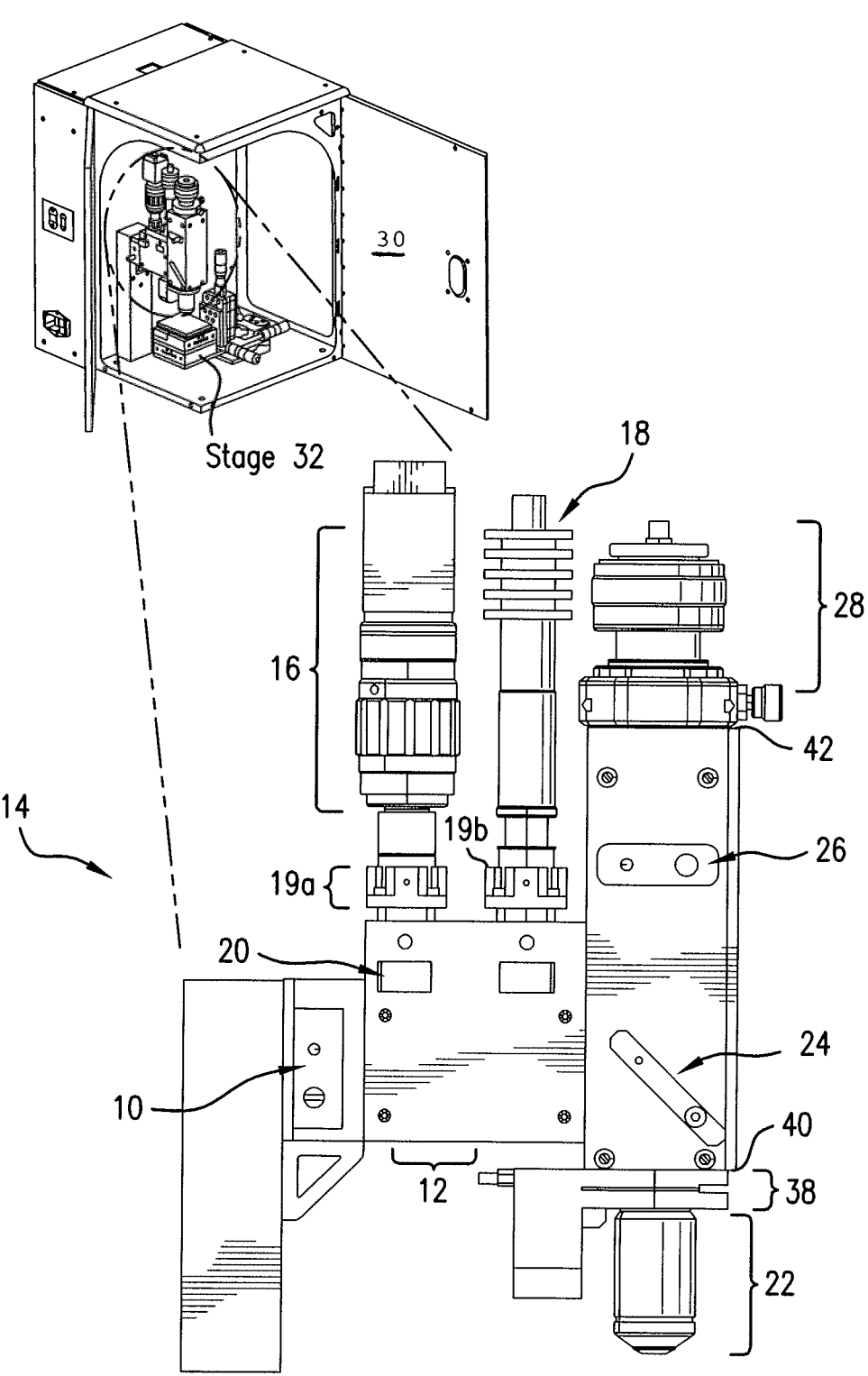
FIG. 1 shows a view of the optical train with specific modules and assemblies noted. The example but beneficial configuration allows a user to change excitation wavelengths rapidly and easily. The dichroic mirror, long pass filter, LED and laser modules are quickly changeable.

A beneficial microscope embodiment, as disclosed herein and as generally shown in FIG. 1, includes, but is not limited to, the following example parts:

A removable (changeable) LED module 10 for, for example, widefield illumination.

A filter assembly 12, which, in various embodiments, contains:

Removable beamsplitter module (detailed in later figures) to direct light to the camera assembly and direct laser light to the microscope main body shown generally as assembly 14.

Tilt plates 19a and 19b for aligning the camera assembly 16 and laser module 18.

Removable camera assembly 16 for widefield imaging. The camera assembly 16 is inserted into a tilt plate.

Removable laser module 18 for laser excitation. The laser module 18 is inserted into a tilt plate.

Removable notch filter module 20 to reduce the laser intensity imaged by the camera.

A main body 14, which contains:

A removable objective lens 22 to focus laser light onto the sample and collect light emitted from the sample.

Figure 11:
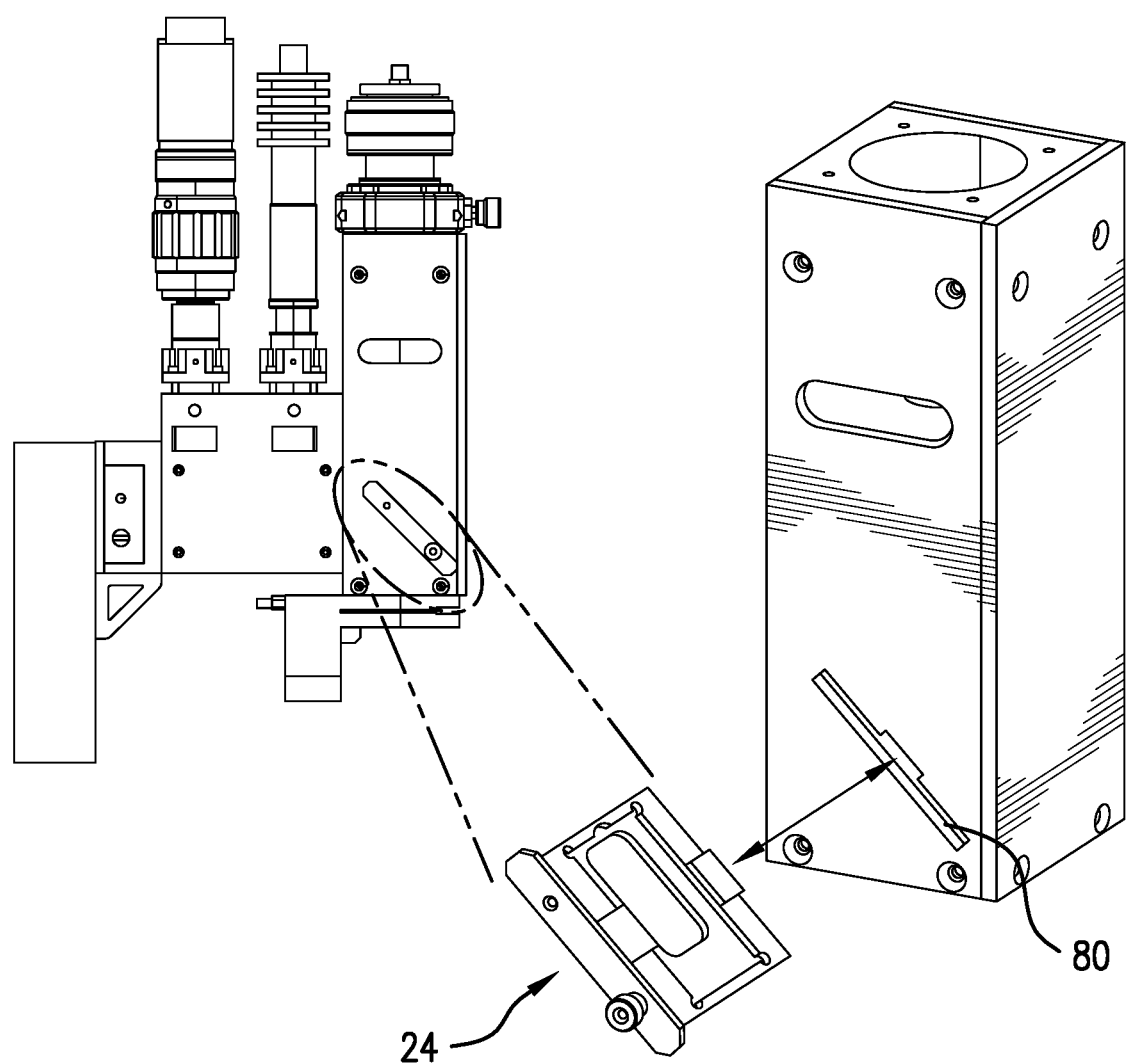
FIG. 11 shows an example dichroic module and location on a main body where it is inserted.

A removable dichroic module 24 to reflect the laser onto the sample and transmit emitted light to the filter assembly. The dichroic module is preferably slidably inserted into a 45° slot (see FIG. 11, slot 80), and is removable therefrom.

A removable long pass module 26 to reject laser light (e.g., stray light beams, etc.). The long pass module 26 is insertable into a horizontal slot (see FIG. 12, slot 82) and is removable therefrom.

A removable fiber assembly 28 to transfer light to the spectrometer (not shown, but preferably connected by fiber to the fiber assembly 28). The fiber assembly 28 also provides XYZ positioning for the fiber. The fiber assembly 28 is inserted into the bore on top.

Figure 2:
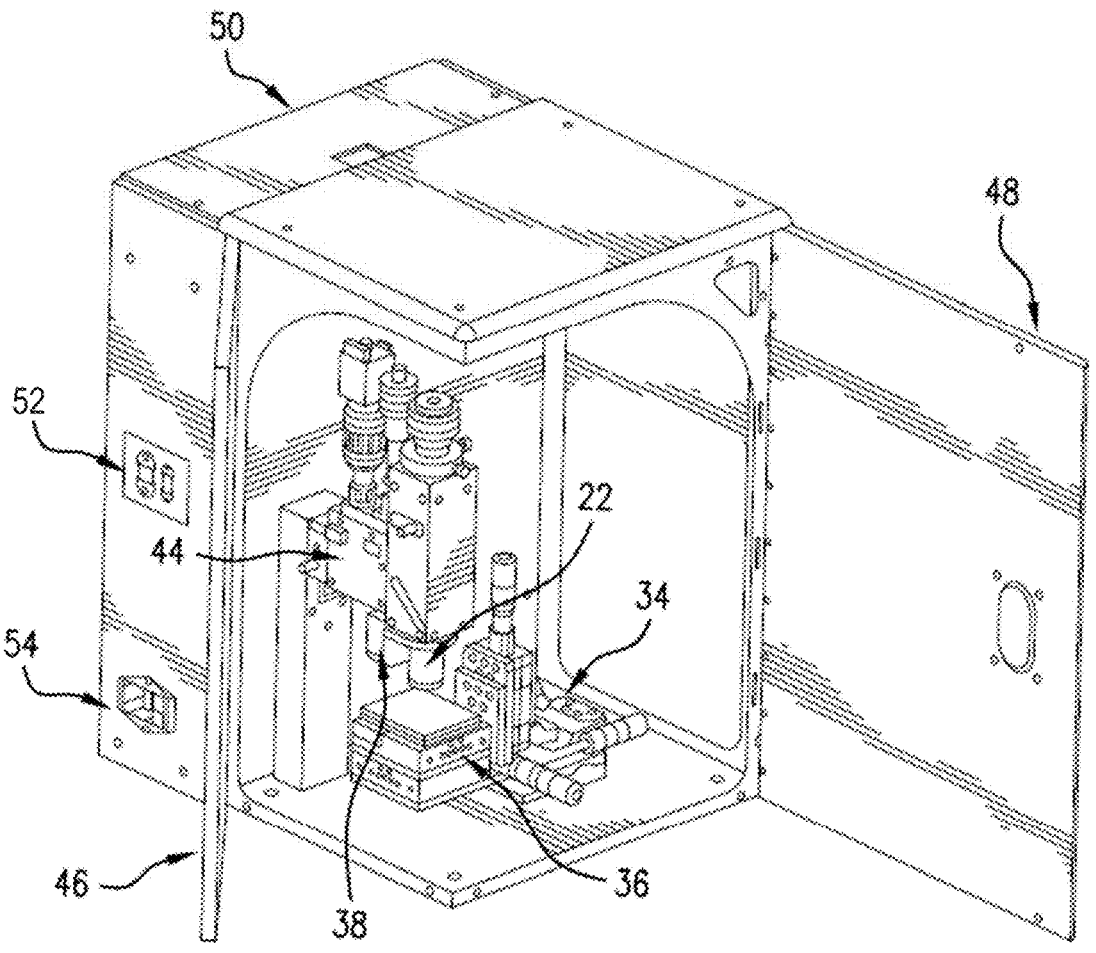
FIG. 2 shows an example enclosure (housing) with integrated back electronics panel, double doors (open), optical train, manual stage, voice coil stage, Z piezo stage and objective lens shown (the spectrometer is not shown for simplicity).

The main body 14 with all of the attached components can be positioned in a housing 30 so as to scan on inspect a sample on a stage 32. With reference to FIG. 2, the stage 32 can be from a variety of sources and can have manual stage components 34, coupled to voice coil stages 36, and can be used to move the sample underneath the objective lens 22 in the X and Y dimensions. The objective lens 22 can include Z-stage components 38 for movement in the Z dimension.

The scanning XY stage 32 (e.g., voice coil) may be used to scan the sample and provide spectroscopic imaging (FIG. 2).

The Z-stage 38 between the microscope main body 14 and the objective lens 22 can be used for moving the objective lens 22 vertically, which can be used for autofocus and topographic mapping (see FIGS. 1 and 2). While an XY stage 32 and Z-stage 38 are disclosed, it is also to be appreciated that a piezoelectric nano-positioning stage for lateral scanning and/or z scanning can also be utilized when desired. Also, in an x-y-z stage arrangement, such an arrangement is often a motorized linear stage configuration (e.g., stepper motor driven linear stages). Moreover, the aforementioned manual positioning is also available in combination with motorized positioning for large/small area translation. An example stepping maneuver using stages known and understood by those of ordinary skill in the art, is about 0.1 microns laterally but can also be any larger step increment depending on the application.

The housing 30 (or other enclosure) can keep out light and dust, provide laser safety, and house the electronics.

With reference to FIGS. 1 and 2, the microscope main body 14 has a first portion 40 connected or connectable to at least one objective lens 22 and a second portion 42 connected or connectable to at least one fiber assembly 28 that delivers optical information to a spectrometer (not shown). The microscope main body 14 provides one or more optical pathways from at least one light emitting diode (LED) port 57 (see FIG. 3) to which the LED module 10 is connected and at least one laser source port 59 (see FIG. 4) to which the laser module 18 is connected and at least one camera port 61 (see FIG. 4) to which the camera assembly 16 is connected, the first portion 40 connected or connectable to the at least one objective lens 22, and the second portion 42 connected or connectable to the at least one fiber assembly 28. These optical pathways are sometimes referred to herein as an optical train 44. As shown in FIG. 2, a side door 46 and a front door 48 can provide access inside the housing 30. An electronics compartment 50 may be attached to the housing 30, and it could be accessible to computers and computer information through USB ports 52 and for control of power 54 to the microscope.

As will be discussed in more detail below, one or more modules (e.g., LED, laser, notch filter, dichroic, and long pass) or other components may be configured as a kit for specific scanning applications. An important feature of the invention is that the modular design allows for the microscope main body 14 to be reconfigured, by for example, selecting a laser module 18 of a specific wavelength, a long pass filter module 26 to allow only specific wavelengths to pass, and a specific dichroic mirror module 24 for reflecting and/or allowing to pass only specific wavelengths of light. Other exemplary kits may pair specific LED modules 10 with specific laser modules 18 for specific applications.

Electromagnetic Source (LED Module)

Figure 3:
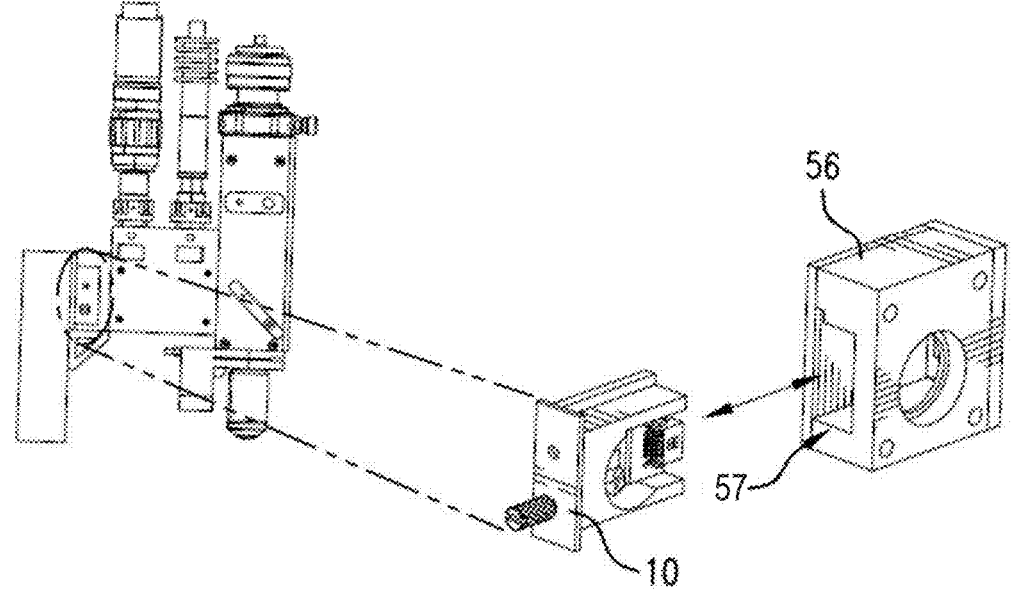
FIG. 3 shows an example but beneficial LED module and installation location.

An electromagnetic source, such as, for example, a light emitting diode (LED) or often a laser diode is the light source used for widefield images captured by the camera assembly 16. The LED is changeable to allow flexibility in the choice of illumination type and wavelength so as to often but not necessarily provide hyperspectral interrogation/analysis (see FIG. 3). As is shown in FIG. 3, the LED module 10 can and is often mounted in a keyed carrier 56. In particular, the LED module 10 can slide into (and slide out of) the LED assembly carrier 56 in the optical train. The LED carrier 56 preferably has a built-in electrical connector which fits into the corresponding connector inside the housing. The LED module 10 preferably is self-selecting for the proper drive current. In some kits, it may be useful to have a plurality of LED modules for different applications, where one LED module is inserted into the carrier 56 at a time.

Color LEDs are most often used for visual inspection and are typically chosen so that they have a slightly shorter wavelength than the laser that is used for excitation during scanning. For example, at 385 nm LED may be used in conjunction with a 405 nm laser. With this example, and with reference back to FIG. 1, the LED module 10 would have a 385 nm LED and the laser module 18 would provide a 405 nm laser. These values can vary widely depending on the application.

Filter Assembly

The filter assembly 12 in FIG. 1 can contain any number of optical components understood in the art, such as, but not limited to, beam-splitters, mounts, filter holders, notch filters and associated modules, tilt plates and associated mounts, and serves as an attachment point for the camera and laser module. The beam-splitters are often mounted inside the module, while filters slide into the module. The laser module 18 and the camera module 16 often but not necessarily attach to the top of the filter assembly 12, typically via the tilt plates 19a and 19b.

Beamsplitter Module

Figure 4:
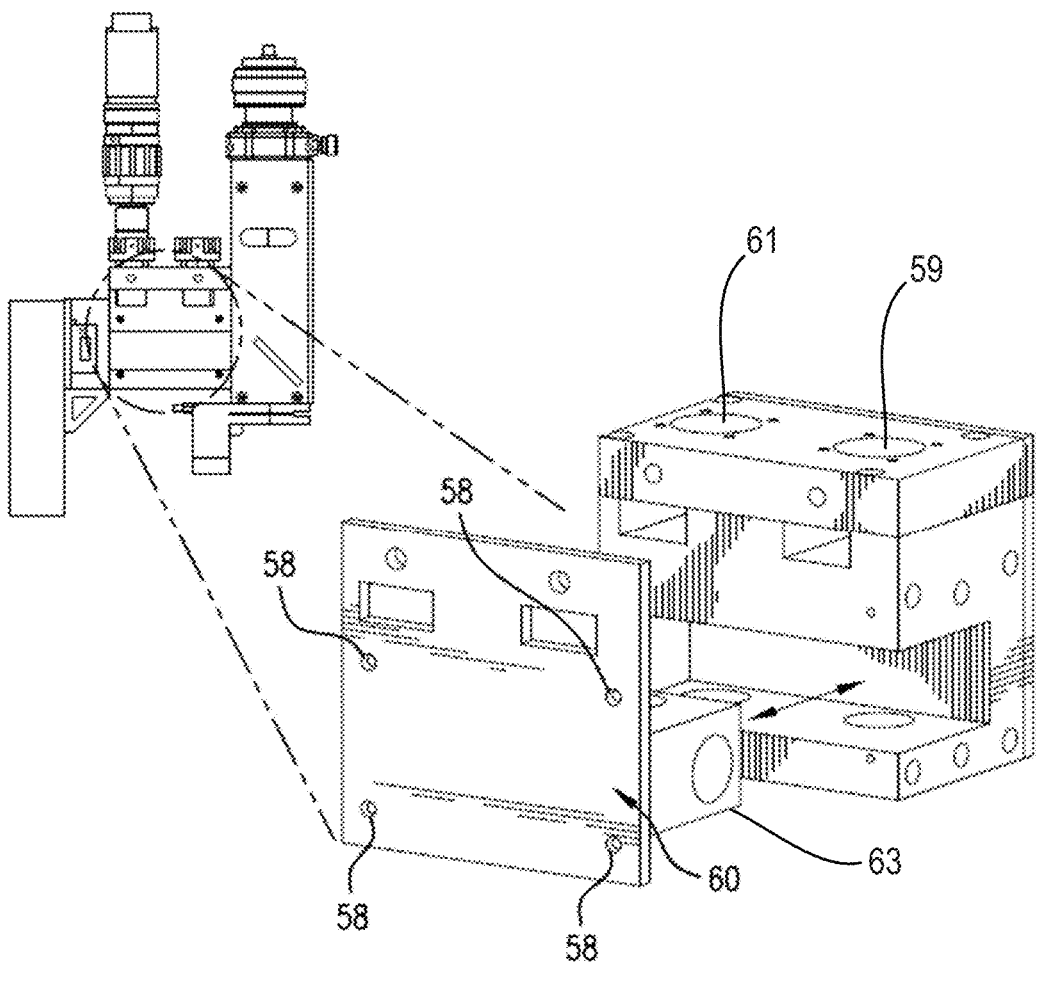
FIG. 4 shows an example beam-splitter module and installation location.
Figure 5:
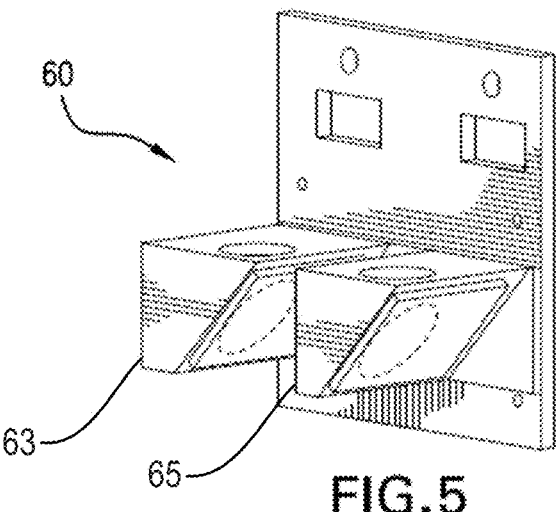
FIG. 5 shows an example beam-splitter module.

Plate beam-splitters are supplied as a module on a metal carrier to ensure proper and repeatable alignment. FIG. 4 generally shows how the beam-splitter assembly can be removed. That is mounting screws can be positioned at a number of screw locations 58 to secure a selected beam-splitter module 60, for example, as the filter assembly 12 (shown in FIG. 1). FIG. 5 shows a different view of a beneficial beam-splitter module 60, as disclosed herein. The FIG. 5 implementation of the beamsplitter module 60 includes at least a first beam splitter 63 that is arranged in line with a laser beam projectable from at least the laser module 18 source and to direct a portion of a split beam from the laser beam towards the at least the dichroic module 24. The FIG. 5 implementation of the beamsplitter module 60 also includes a second beam splitter 65 positioned in line with the camera module 16 and arranged to direct a portion of reflected light from at least the dichroic module 24 towards at least the camera module 16. To replace the beam-splitter assembly, a coupling arrangement, such as, but not limited to, mounting screws, can be removed and the beam-splitter module is then capable of being pulled out. Replacement is the reverse of removal. In some kits, a plurality of beamsplitter modules 60 or other modules can be provided to selectively function as the filter assembly 12.

Tilt Plates

Figure 6:
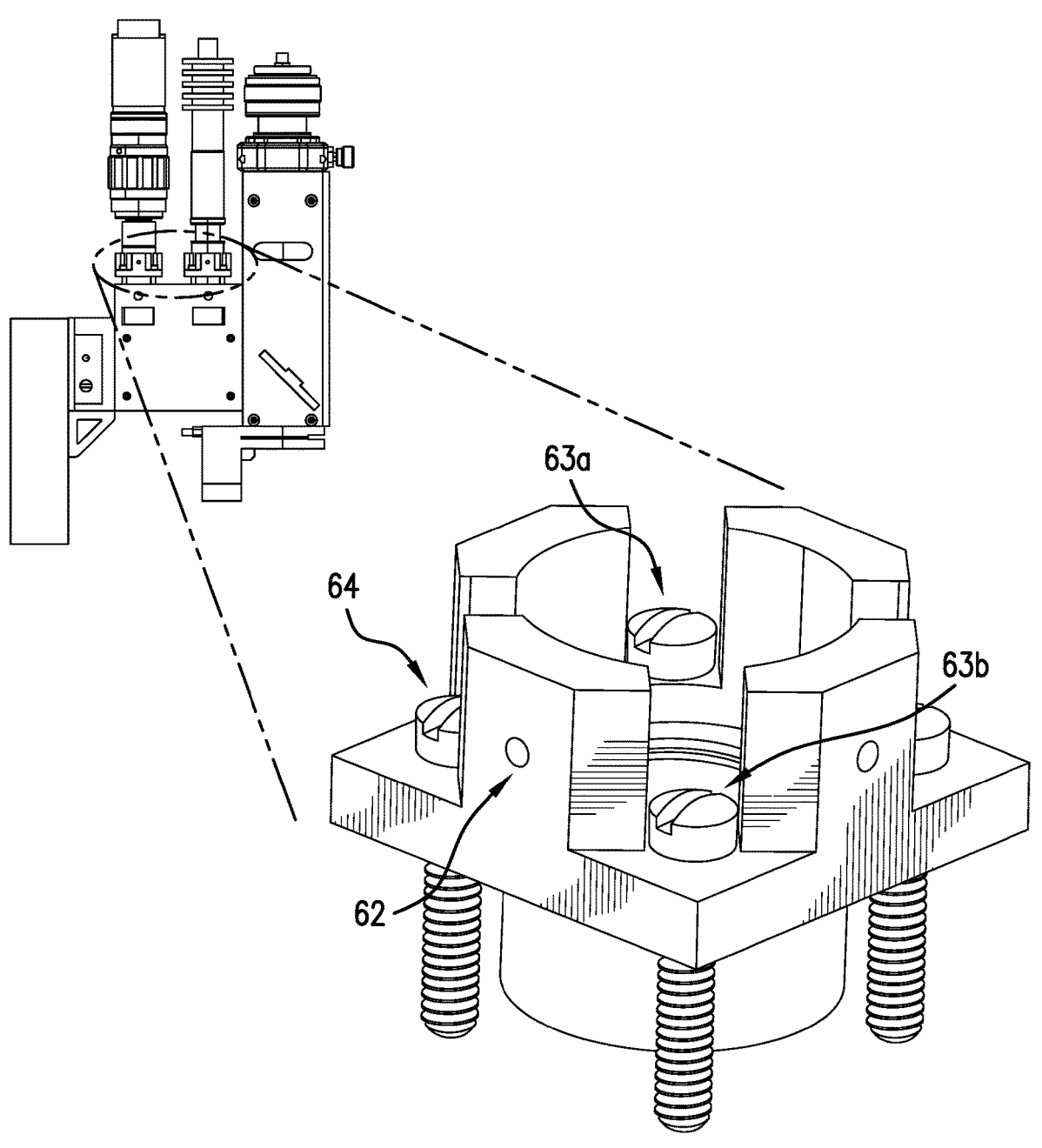
FIG. 6 shows a beneficial tilt plate and installation location (Springs not shown for simplicity).

With reference to FIG. 1 laser module 18 and the camera module 16 are held onto the filter assembly 12 via removeable coupling mechanisms, e.g., quick-release tilt plates 19a and 19b. FIG. 6 provides a close up view of an exemplary tilt plate 19a or 19b. Preferably, the plates provide three degrees of freedom (X 63a, Y 63b, and rotation 64) for alignment. The bottom of the camera module 16 and laser assembly 18, which fit into to the tilt plates 19a and 19b, are sized to be compatible with lens tubes as known and understood by those of ordinary skill in the art (e.g., Thorlabs® SM05 lens tubes). User-made optics can be mounted in lens tubes and attached to the camera or laser module as desired.

The quick release tilt plates are removably coupled (e.g., screws see set screw location 62) and often with resiliency components (e.g., springs) to allow fine adjustment to the position of the laser and centering of the wide field image (e.g., by selectively tightening and loosening the screws if such is the arrangement). A set screw can be utilized in the quick release tilt plates to also allow easy removal of the laser module 18 and the camera module 16 while mostly preserving the alignment of the microscope.

Camera Assembly

Figure 7:
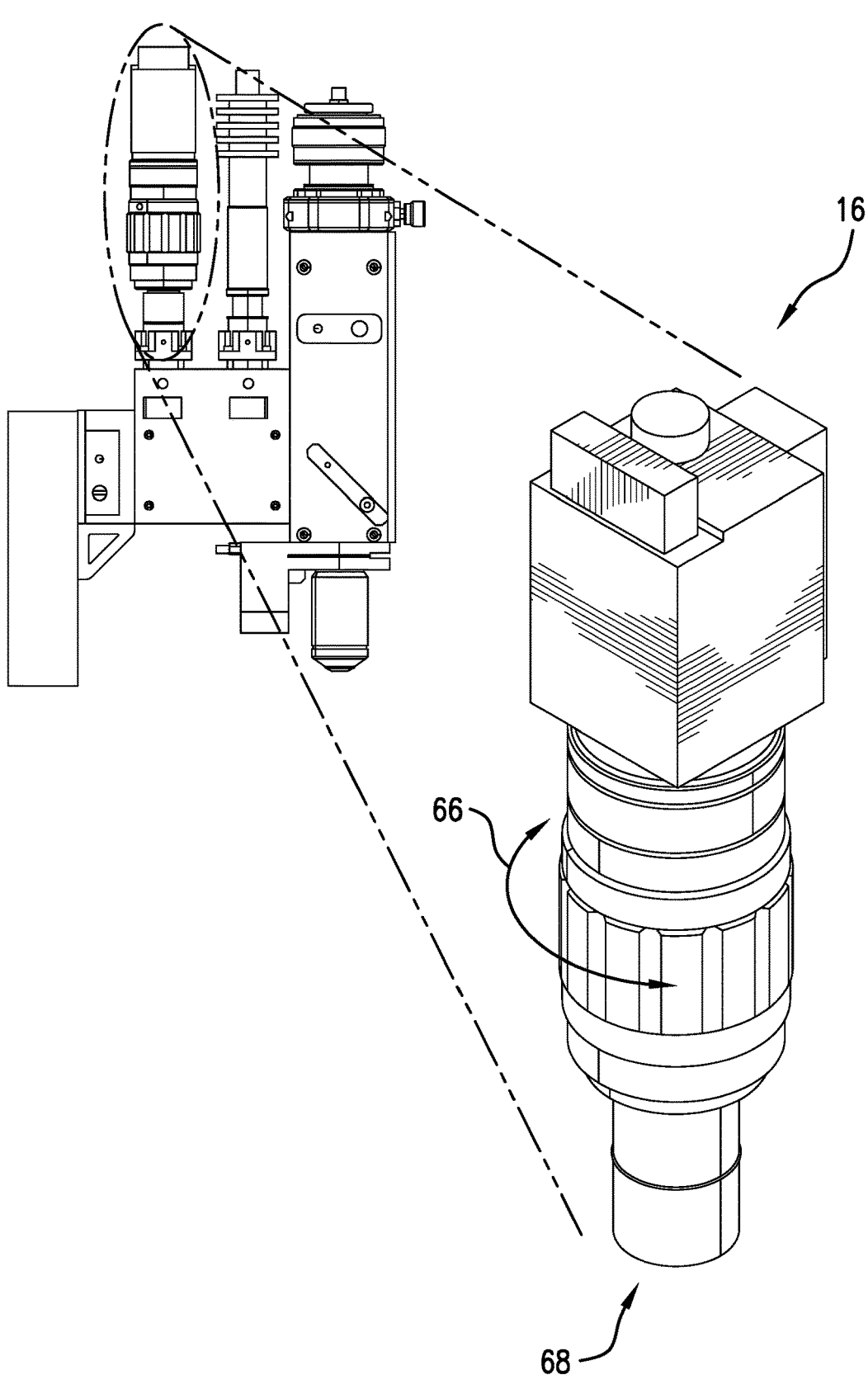
FIG. 7 shows an often but not only camera assembly and installation location.

FIG. 7 shows a beneficial camera assembly 16 comprising a detector (often a high-resolution monochrome camera detector), lenses, and mounting hardware. A lens arrangement, often an achromatic lens and a focus adjustment barrel 66 are used to minimize chromatic aberration. An example method of operation allows a user to rotate the focus adjustment barrel 66 to line up with a marker corresponding to the appropriate wavelength kit.

The camera assembly 16 serves a dual purpose. First it is a means of viewing the sample. Second, it provides the feedback needed for the autofocus algorithm to properly focus the excitation on the sample. The camera system is designed to work in conjunction with filtering arrangements that often include a notch filter module 20, which reduces the intensity of laser light. If needed, the end of the camera lens tube can accommodate additional lens tubes for filters 68.

Laser Module

Figure 8:
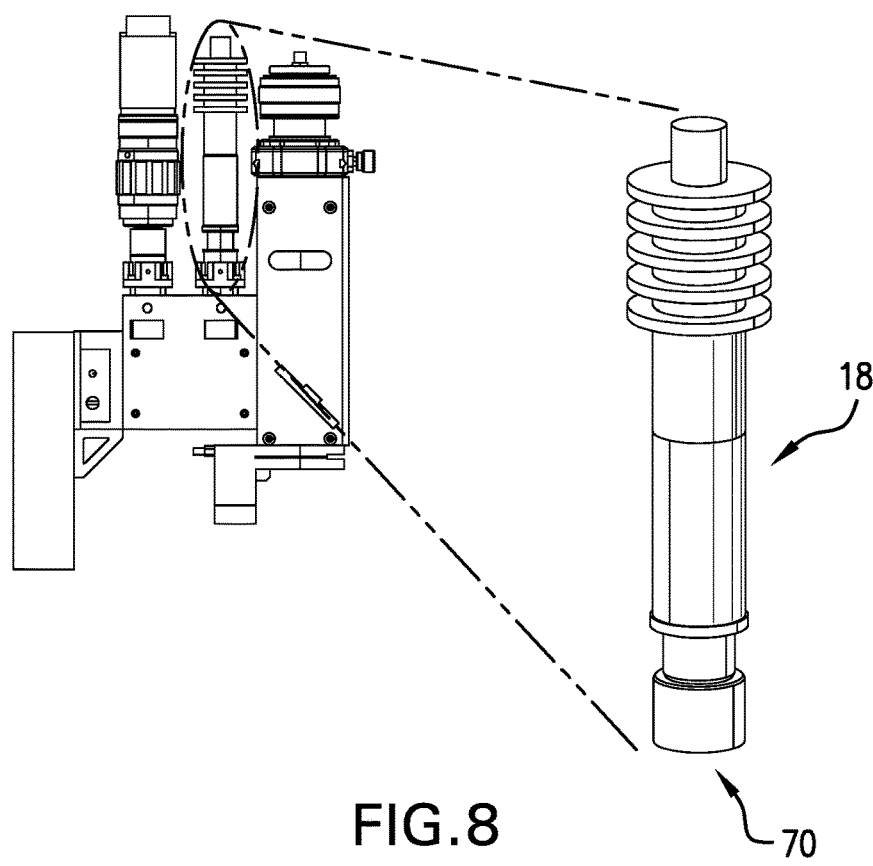
FIG. 8 shows a laser module (compact laser) and installation location. Additional optics may be placed in SM05 lens tubes and screwed onto the end of the module.
Figure 9:
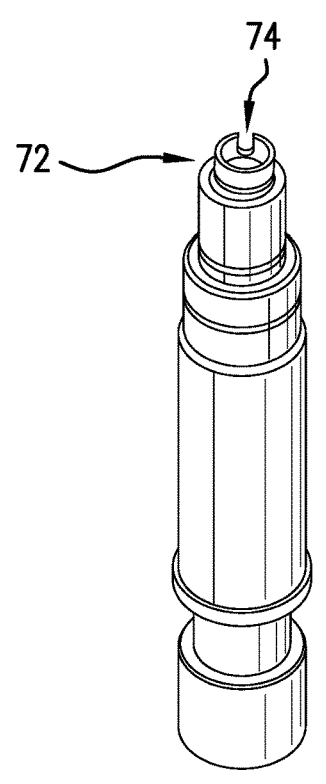
FIG. 9 shows an example beneficial fiber coupled laser module. The fiber from an external laser attaches to the top of the module.

The laser module 18, shown in FIG. 1 and FIG. 8, serves as the excitation source. While light source modules can include a number of different sources, the two most often types of laser modules include a compact diode laser and/or a fiber coupled laser module. The modules contain all necessary filters and optics known in the art to provide the best possible beam characteristics. For a compact laser module arrangement (see FIG. 8), the whole assembly can be placed into the quick release tilt plate 19b (FIG. 1) and fixed in place (e.g., set screw 62 in FIG. 6). Additional tubes and filters 70 can be added to the end of a laser module 18. As noted above, kits can include a plurality of different laser modules 18 depending on the application. A power cable (not shown) is attached to the laser. For fiber coupled laser modules (see FIG. 9), the fiber from the fiber connector 72 goes to a laser box that is external to the microscope. A key slot 74 can be used for fiber alignment.

Notch Filter Module

Figure 10:
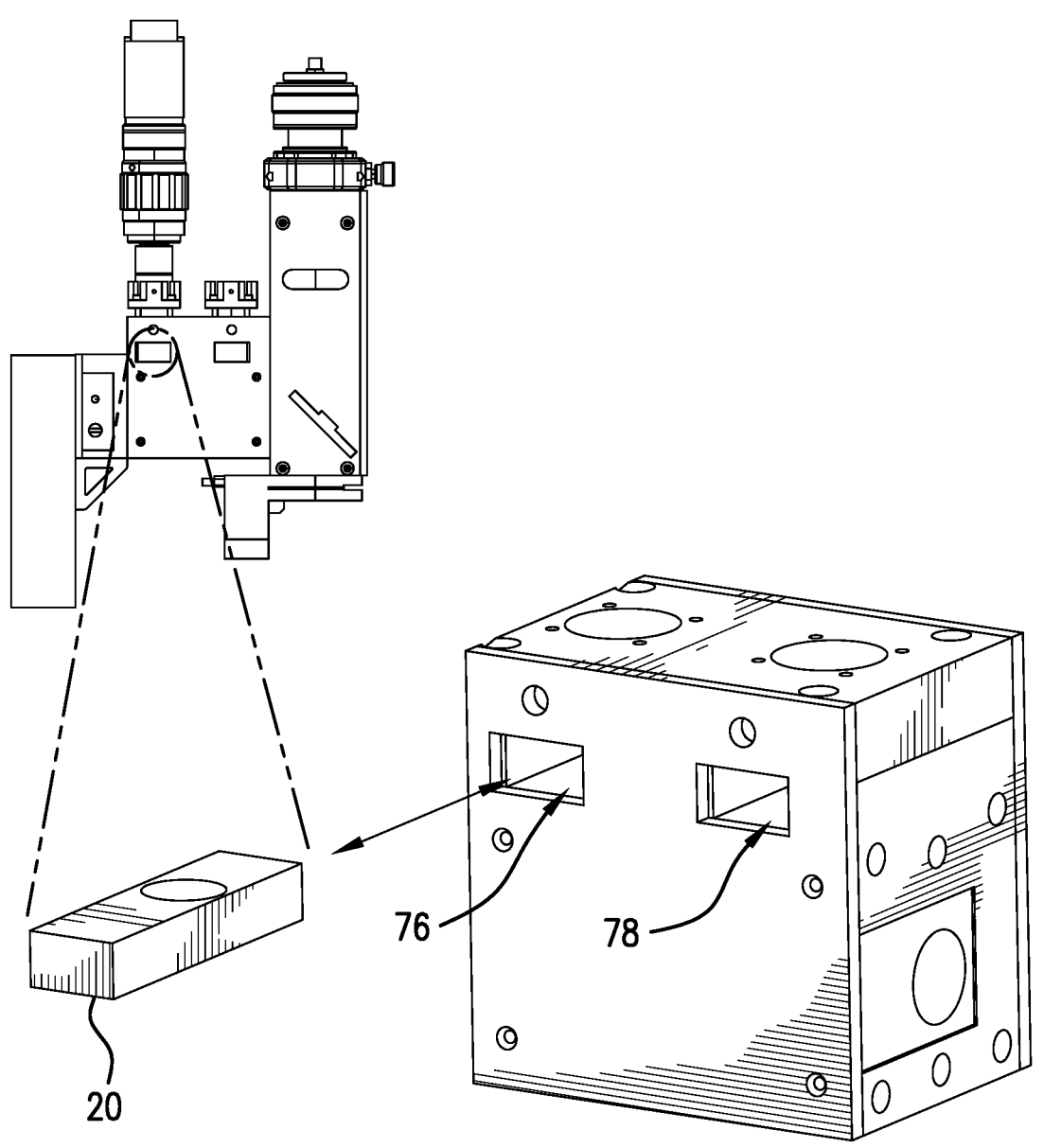
FIG. 10 shows an example notch filter module and location on a beneficial filter module for insertion.

The notch filter module 20, shown in FIG. 1 and FIG. 10, is placed directly below the camera assembly 16 in a notch filter assembly slot 76 in the main body 14. This optic serves the purpose of reducing the laser intensity reaching the camera. The notch filter supplied with a kit may be chosen to reduce only the intensity of the defined wavelength band and pass all other wavelengths. Thus, the LED light is allowed to pass and the sample can be observed. Additional excitation filters can be placed in the slot 78 of the main body under, for example, the laser module 18.

Main Body

With reference to FIG. 1, the microscope main body 14 is where the objective lens 22, dichroic mirror module 24, long pass filter module 26, and fiber assembly 28 are located. The objective lens 22 is attached to a threaded hole at the bottom;

e.g., at the first portion 40 of the microscope main body 14. The other components are described in the above and following subsections.

Dichroic Module

A dichroic mirror reflects light with a shorter wavelength than the designed cutoff wavelength and passes light that has a longer wavelength than the cutoff. Thus, the dichroic mirror reflects the excitation source and transmits the longer-wavelength signal light. The dichroic mirror is mounted in a keyed housing and this whole part is referred to as the dichroic module 24 (see FIG. 1 and FIG. 11, with an enlarged dichroic module slot 80 illustrating the keyed connection in FIG. 11). The beneficial key configuration prevents the user from inserting it upside-down. Coupling arrangements, such as, for example, magnets engage the dichroic module 24 for a snug fit.

The dichroic mirror of the dichroic module 24 can be replaced with, for example, a beam-splitter for reflectance measurements. Typically, this is done with a beam-splitter, often a 50/50 beam-splitter, which means that half the light incident on the beamsplitter is directed downward and half goes through it regardless of the wavelength.

Long Pass Module

Figure 12:
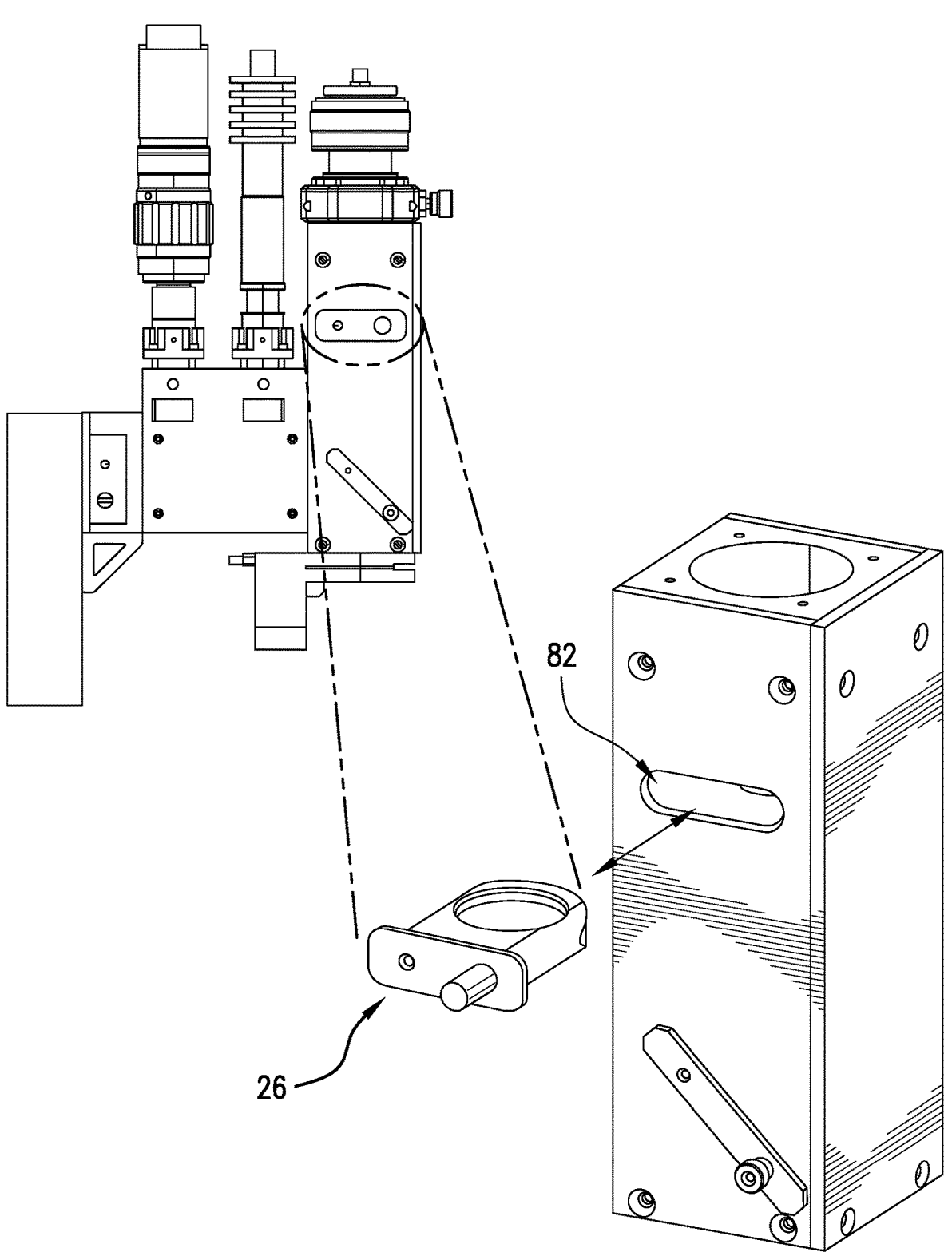
FIG. 12 shows an example long-pass module and location on a main body where it is inserted.

With reference to FIG. 1 and FIG. 12, in the upper part of the main body 14 is another removable filter, often a long pass filter module 26 which is slidable into (and removable from) slot 82 in the main body. The long pass filter module 26 is designed to block light below a certain wavelength and pass light that is longer than the specified wavelength. This filter is used to block any stray laser light that passed through the dichroic module. In some applications, a kit may contain a plurality of long pass filter modules 26 to suit the needs of different applications.

Fiber Assembly

Figure 13:
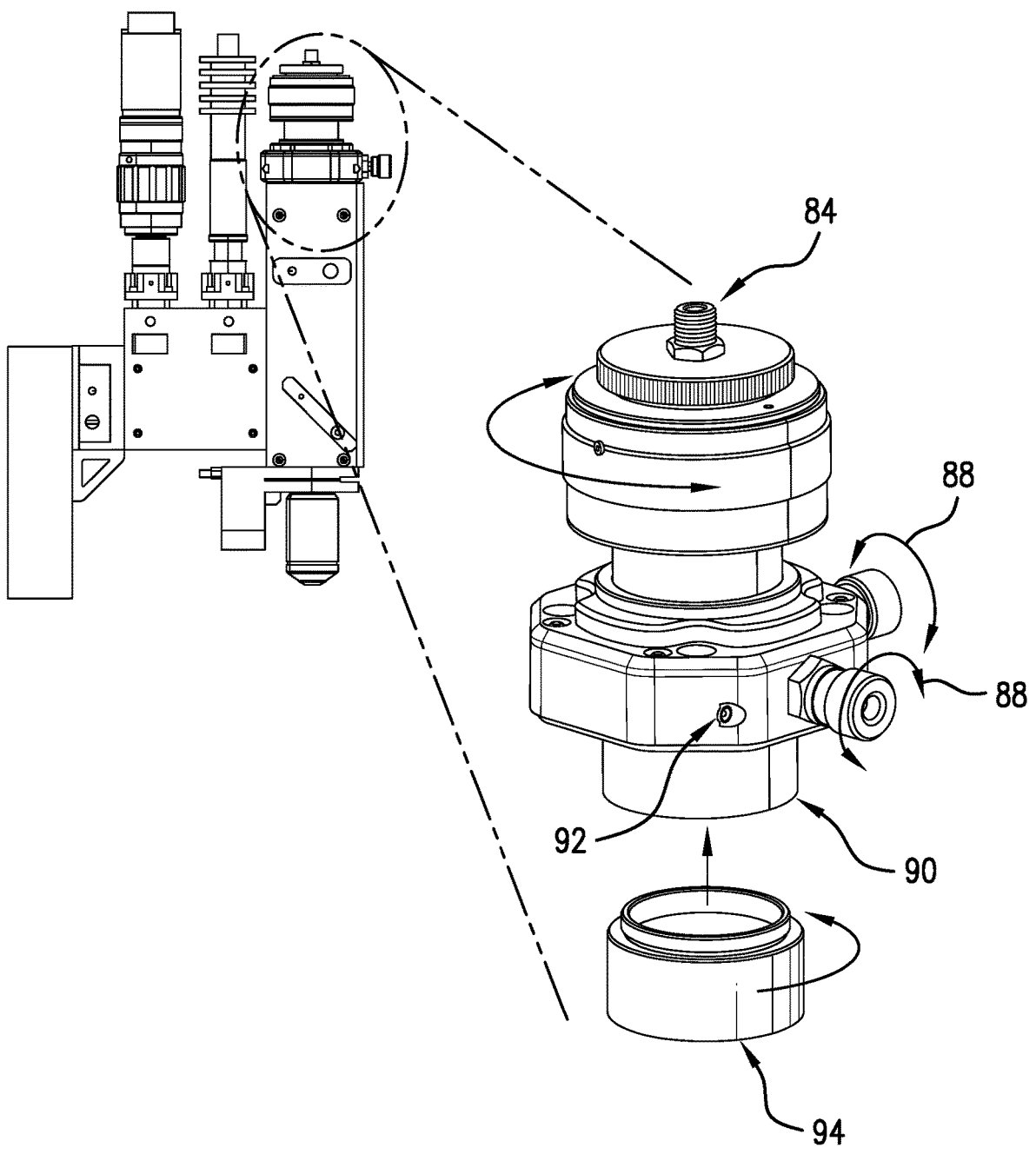
FIG. 13 shows an example fiber assembly and location on a main body where it is inserted.

An optical fiber is connected to the spectrometer (not shown) and fiber assembly 28 (see FIG. 1 and FIG. 13). The fiber transfers light emitted by the sample (the "signal") to the spectrometer.

The fiber assembly 28 attaches to the top of the microscope main body 14 at the second portion 42 of the microscope main body. From top to bottom it is comprised of an SMA fiber coupling 84, a Z adjust 86, an X-Y adjust 88, and lens tube 90. The Z adjust 86 rotates to change the spacing from the lens to the multimode fiber without rotating the fiber, while the X-Y adjust 88 allows the focused light to be incident on the core of the fiber. The lens tube 90 contains a focusing achromatic lens, which focuses the signal light onto the fiber.

The lens tube 90 at the bottom of the fiber module can be arranged to slide into the bore of the main body at second portion 42, while cage rods (e.g., 30 mm rods) guide it into precise position. Fasteners 92 (e.g., set screws) secure the cage rods to the module for a desired placement. Additional optics 94, such as other filters or a polarizer, can be attached below the lens. The module supports direct attachment of SM1 threaded lens tubes (such as Thorlabs® part number SMIL05 or SMIL03).

Kits

A collection of modules or other components is referred to as a "kit." Kits can add additional capabilities such as different excitation wavelengths, Raman spectroscopy, and reflectance spectroscopy. Replaceable optics are pre-set and mostly self-aligning, and so do not require user modification or maintenance.

Wavelength kits are provided for particular wavelengths or applications. All kits may be color-coded and marked so the user can tell at a glance which kit is installed and if all

Figure 14:
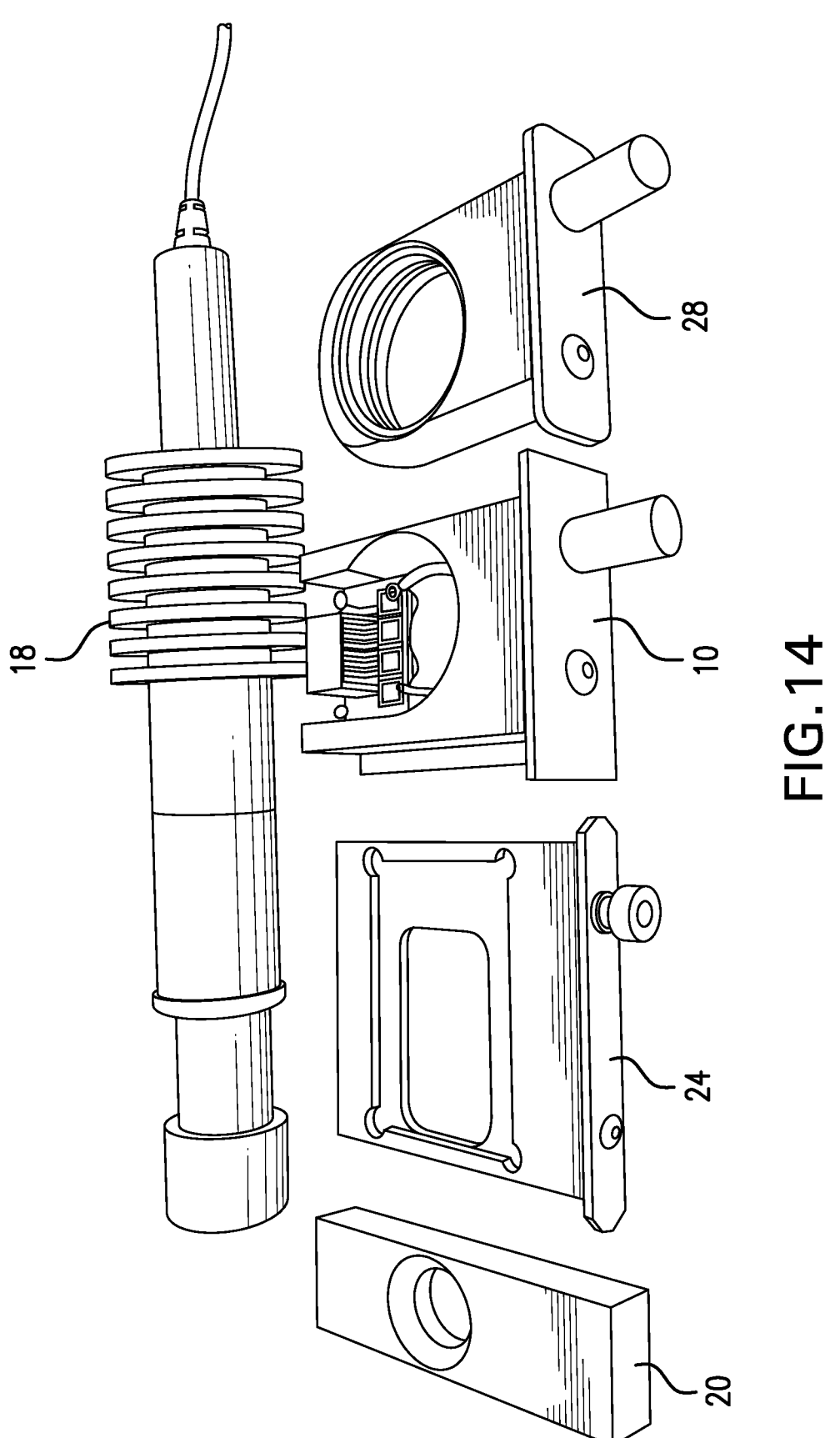
FIG. 14 shows an example photograph of a green 532 nm kit.

7 parts are installed. FIG. 14 shows that exemplary parts of any kit may include one and preferably a plurality of the LED light module 10, the notch filter 20, the dichroic mirror module 24, the long pass filter module 26, and a laser module 18. In some applications, a plurality of each of these components may be provided. Some components like the beamsplitters and camera lens work with a wide variety of choices and only need to be changed under certain circumstances.

Kit Examples

Examples 1-4, focus on the laser, dichroic mirror, and long-pass filter. The other components of an exemplary kit include the beamsplitters, fiber module LED, and notch filter. Beamsplitters come in overlapping UV, visible, and NIR spectral ranges. The beamsplitters and fiber module must be suitable for the laser wavelength. The LED has a wavelength shorter than the laser and is included for wide-field sample inspection. The notch filter blocks the specific wavelength of the laser from reaching the camera.

Example 1 Bright Emitters in Gallium Oxide

Gallium oxide ($Ga_2O_3$) is a semiconductor that is being researched for applications in high-power electronics. To investigate the photoluminescence (PL) of this material, a UV kit according to an embodiment of this invention was used. This kit consisted of a 355 nm laser, 355 nm dichroic mirror (which reflected the laser light into the objective and transmitted the longer-wavelength PL), and 355 nm long-pass filter (which transmitted wavelengths >355 nm). The PL map showed certain regions on the sample surface that had bright emissions near 375 nm. Alternative embodiments of this kit include a 349 nm to 405 nm laser, a 349 nm to 405 nm dichroic mirror, and a 349 nm to 405 nm long-pass filter.

To investigate these bright emitters further, the UV kit was swapped for a Raman kit according to another embodiment of this invention. This kit consists of a 532 nm laser, 532 nm dichroic mirror, and 532 nm long-pass filter. The peaks in the spectrum correspond to vibrational modes of the material. It was found that, in the bright emitter regions, specific vibrational modes were observed. The frequencies of these modes indicated that the bright emitters were a chemical compound consisting of silicon, carbon, and hydrogen, rather than the $Ga_2O_3$ itself. The chemical compound likely came from the polishing compound that was used to fabricate the smooth surfaces of the sample.

The UV kit and Raman Kit are basically the three components two of which fit within slots in the main body (i.e., the dichroic module (see FIG. 11) and the long-pass filter module (see FIG. 12)) and the selection of a laser source (see FIG. 8). Suitable components for a dichroic module and a long-pass filter are available from a variety of sources including Semrock, Edmund Optics, and Thorlabs. Suitable lasers are available from a variety of sources including Thorlabs and Coherent.

Example 2 Indium Phosphide

Indium phosphide (InP) wafers are frequently used as substrates for the growth of infrared laser and LED heterostructures. Wafers are commercially available and may easily be obtained in large quantity for production. Defects in substrates are generally specified as a dislocation density, but the inhomogeneity of their distribution and the range of sizes is not known from one wafer to the next. When growing a new device on such a wafer, it is imperative to understand how the substrate defects affect the heterojunctions above them that comprise the active layers of the device. At a minimum, the quality of the wafers should be measurable in order to determine whether they are of sufficient quality to be used in the production of reliable devices with near-zero latent defects.

A square 10 mm commercial InP wafer was obtained. To investigate defects in this material, a red kit according to another embodiment of the invention was used. This kit has a 635 nm laser, 635 nm dichroic mirror, and 635 nm long-pass filter. Scanning the wafer, dislocations were identified via a decrease in PL intensity and shift in the PL wavelength. The defect density agreed with that specified by the supplier (~50,000/sq.cm).

Example 3—InP Based Alloys

By alloying with different elements, InP-based semiconductors can be made to emit light in the important telecommunication wavelength range around 1300 nm. To investigate such materials, a NIR Kit according to a further embodiment of this invention was used. This consists of a 940 or 975 nm laser, matching dichroic mirror, and long-pass filter. To acquire the PL emission, a spectrometer with an InGaAs detector array is used, which has a useful spectral range of 900-1700 nm. Defects in a device are evident by a change in PL intensity and/or a shift in PL wavelength.

Example 4 Ultra-Wide Bandgap Semiconductors

Some semiconductors have a bandgap that is "ultra-wide." An important example is aluminum gallium nitride (AlGaN), which has applications in UV LEDs that can be used for sterilization. For these materials, a high photon energy (short wavelength) is required to generate PL. To address this need, a deep UV kit according to another embodiment of this invention was used. The deep UV kit consists of a 266 nm laser, 266 nm dichroic mirror, and 266 nm long-pass filter. It also has a UV-enhanced camera that can detect wavelengths in the deep UV (~266 nm) range. The UV enhanced camera is required for sample inspection, so the user knows where data is being collected from.

Example 5 Reflectivity

A reflectivity spectrum shows how much light is reflected from a sample, as a function of wavelength. An exemplary reflectivity kit according to an embodiment of the invention consists of a white LED and a glass (or similar) beamsplitter that reflects a portion of the LED light and transmits the reflected light from the sample. No long-pass filter is required. The reflected spectrum is compared to a reference; for example, a highly reflecting mirror. The reflectivity is defined as $R=I_{sample}/I_{reference}$, where I is the signal intensity. Low reflectivity means that the sample is absorbing in the given spectral region. This kit can be used on any type of material. The reflectivity kit has been successfully used to scan a $100 bill.

It is also to be noted that the configurations herein are often coupled to a computer/processor (not shown) and can include any known in the art computing device. Example computing devices, as disclosed herein, often includes incorporated individual software modules, components, and the routines utilized may be a computer program, procedure, or process written as source code in C, C#, C++, Java, and/or other suitable programming languages. Image processing and data analysis are often incorporated and done in MAT-LAB® and Origin®. The computer programs, procedures, or processes may be compiled into intermediate, object or machine code and presented for execution by any of the example suitable computing devices discussed above. Various implementations of the source, intermediate, and/or object code and associated data may be stored in one or more computer readable storage media that include read-only memory, random-access memory, magnetic disk storage media, optical storage media, flash memory devices, and/or other suitable media. A computer-readable medium, in accordance with aspects of the present invention, refers to media known and understood by those of ordinary skill in the art, which have encoded information provided in a form that can be read (i.e., scanned/sensed) by a machine/computer/processor and interpreted by the machine's/computer's/processor's hardware and/or software. It is also to be appreciated that as used herein, the term "computer readable storage medium" excludes propagated signals, per se.

It is also to be noted that the system itself can be configured with a communication interface (not shown) that includes a wireless transmitter/receiver unit to transmit signals from, for example, the processor to other devices (e.g., a network, and/or via a direct connection to another device), and to receive signals from other devices and communicate the received signals back to processor.

A display of any data can include an electronic display (e.g., including a flat panel display element such as a liquid crystal display element, an organic light-emitting diode display element, an electrophoretic display element, or another type of display element) of any location coordinates and/or physiological measurements provided by the catheter. Moreover, such a display can also include via a graphical user interface (GUI) to aid the user in orchestrating the manipulation and detection any information gathered.

Moreover, various methods and protocols for sending commands to and receiving signals from the microscope system can include USB, serial, parallel, FireWire and other conventional and proprietary peripheral device connections. In addition, some or all of the separate modules can be communicatively connected and controlled via the utilized software/processor through connections external to the mechanical connection points and all connections (communication lines, power, etc.) can be any suitable electrical contact connections or wired connections.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

We claim:

1. A modular microscope kit, comprising:
a microscope main body comprising a first portion connected or connectable to at least one objective lens and a second portion connected or connectable to at least one fiber assembly that delivers optical information to a spectrometer,
wherein the microscope main body includes:
at least one light emitting diode (LED) port, at least one laser source port,
and at least one camera port,
at least one dichroic module slot, positioned in the microscope main body between the first portion and the second portion, at least one long pass filter slot, positioned in the microscope main body between the at least one dichroic module slot and the second portion, and
at least one notch filter slot, positioned in the microscope main body in alignment with the at least one camera port, and
wherein the microscope main body is configured to provide one or more optical pathways from the at least one light emitting diode (LED) port and the at least one laser source port to one or more of the at least one camera port, the first portion of the microscope main body, and the second portion of the microscope main body;
at least one LED module that is removably connectable to the at least one LED port of the microscope main body;
at least one camera module that is removably connectable to the at least one camera port of the microscope main body;
at least one laser source that is removably connectable to the at least one laser source port of the microscope main body;
at least one dichroic module that is insertable into and removable from the at least one dichroic module slot in the microscope main body, and has a configuration such that while inserted in the at least one dichroic module slot the at least one dichroic module is positioned to:
direct, in response to receiving generated LED light from the at least one LED light connected to the at least on LED port, a portion of the generated LED light from the at least one LED module towards and through the first portion of the microscope main body, and
direct, in response to receiving generated laser light from the at least one laser source connected to the at least one laser source port, a portion of the generated laser light from the at least one laser source, towards and through the first portion of the microscope main body, and
direct a portion of a reflected light from the first portion of the microscope main body to either the at least one camera module connected to the at least one camera port, or the at least one fiber assembly, via the second portion of the microscope main body;
at least one notch filter module that is insertable into and removable from the at least one notch filter slot in the microscope main body, wherein:
the at least one notch filter slot in the microscope main body is configured such that the at least one notch filter module, while inserted in the at least one notch filter slot, is positioned in alignment with the at least one camera module connected to the at least one camera port, and
the at least one notch filter module is designed to block one or more wavelengths of the generated laser light and to allow other wavelengths of the generated LED light to pass therethrough; and
at least one long pass filter module that is insertable into and removable from the at least one long pass filter module slot in the microscope main body, and has a configuration to block, while inserted in the at least one long pass filter slot, stray light from the at least one laser source from reaching the at least one fiber assembly to which the second portion of the microscope main body is connected.

2. The modular microscope kit of claim 1 wherein the at least one dichroic module and the at least one dichroic module slot in the microscope main body are mutually configured to have a keyed engagement which permits insertion of the at least one dichroic module into the at least one dichroic module slot in only one orientation relative to the microscope main body.

3. The modular microscope kit of claim 1 wherein the at least one long pass filter module and the at least one long pass filter module slot in the microscope main body are mutually configured to have a keyed engagement which permits insertion of the at least one long pass filter module into the at least one long pass filter module slot in only one orientation relative to the microscope main body.

4. The modular microscope kit of claim 1 wherein the at least one LED module and the at least one LED port in the microscope main body are mutually configured to have a keyed engagement which permits insertion of the at least LED module into the at least one LED port in only one orientation relative to the microscope main body.

5. The modular microscope kit of claim 1 wherein the at least one camera module has a focus adjusting barrel.

6. The modular microscope kit of claim 1 further comprising a beam splitter module positioned within the microscope main body and comprising at least a first beam splitter positioned in line with a laser beam projectable from the at least one laser source and configured to direct a portion of a split beam of the laser beam towards the at least one dichroic module.

7. The modular microscope kit of claim 1 further comprising a beam splitter module positioned within the microscope main body and comprising at least a second beam splitter positioned in line with the at least one camera port, and configured to direct a portion of reflected light from the at least one dichroic module towards the at least one camera port, and towards the at least one camera module when connected to the at least one camera port.

8. The modular microscope kit of claim 1 wherein the at least one LED module provides light at a shorter wavelength than the at least one laser module.

9. The modular microscope kit of claim 1, wherein the microscope main body further comprises a laser filter module slot and the modular microscope kit further comprises at least one laser filter module that is insertable into and removable from the laser filter module slot in the microscope main body, and has a configuration such that, while inserted in the laser filter module slot, the at least one laser filter module is positioned to filter a laser beam generated by the at least one laser source.

10. The modular microscope kit of claim 1 wherein the modular microscope kit is configurable for both photoluminescence and Raman spectroscopy.

11. A kit for use with a modular microscope that comprises a microscope main body having a first portion connected or connectable to at least one objective lens and a second portion connected or connectable to at least one fiber assembly that delivers optical information to a spectrometer, wherein the microscope main body includes at least one light emitting diode (LED) port, at least one laser source port, and at least one camera port, and the microscope main body is configured to provide one or more optical pathways from the at least one LED port and the at least one laser source port to the at least one camera port, the first portion connected or connectable to the at least one objective lens, and the second portion connected or connectable to the at least one fiber assembly, wherein the microscope main body further includes a plurality of slots extending from an exterior to an interior of the microscope main body, wherein at least one of the slots in the plurality of slots is a dichroic module slot that is configured to accommodate at least one dichroic module and the at least one LED port is configured to accommodate at least one LED module, the kit comprising:

the at least one dichroic module, wherein the at least one dichroic module and the at least one dichroic module slot in the microscope main body are cooperatively configured to engage with a keyed connection which permits insertion of the at least one dichroic module in only one orientation relative to the microscope main body;

the at least one LED module, wherein the at least one LED module and the at least one LED port have a cooperative configuration such that the at least one LED module is insertable in and removable from the at least one LED port in the microscope main body; and at least one laser source, wherein the at least one laser source and the at least one laser source port have a cooperative configuration such that the at least one laser source is removably connectable to the at least one laser source port of the microscope main body, wherein the at least one dichroic module has a configuration such that while inserted in the at least one dichroic module slot the at least one dichroic module is positioned to:

direct, in response to receiving generated LED light from the at least one LED light connected to the at least on LED port, a portion of the generated LED light from the at least one LED module towards and through the first portion of the microscope main body, and direct, in response to receiving generated laser light from the at least one laser source connected to the at least one laser source port, a portion of the generated laser light from the at least one laser source, towards and through the first portion of the microscope main body.

12. The kit of claim 11 wherein another at least one of the slots in the plurality of slots in the microscope main body is a long pass filter module slot that is configured for at least one long pass filter module, and the kit further comprises at least one long pass filter module wherein the at least one long pass filter module and the at least one long pass filter module slot in the microscope main body are cooperatively configured to have a keyed connection which permits insertion of the at least one long pass filter module in only one orientation relative to the microscope main body.

13. The kit of claim 11 wherein the plurality of slots in the microscope main body further comprises at least one long pass filter module slot for at least one notch filter module, and the kit further comprises at least one notch filter module wherein the at least one notch filter module and the at least one notch filter module slot in the microscope main body are cooperatively configured to have a keyed connection which permits insertion of the at least one long pass filter module in only one orientation relative to the microscope main body.

14. A kit for use with a modular microscope that comprises a microscope main body having a first portion connected or connectable to at least one objective lens and a second portion connected or connectable to at least one fiber assembly that delivers optical information to a spectrometer, wherein the microscope main body includes at least one light emitting diode (LED) port, and at least one camera port, and at least one laser source port, and is configured to provide one or more optical pathways from the at least one LED port and the at least one laser source port to the at least one camera port, to the first portion connected or connectable to the at least one objective lens, and to the second portion connected or connectable to the at least one fiber assembly, wherein the microscope main body has a plurality of slots, each extending from an exterior to an interior of the microscope main body, wherein at least one of the slots in the plurality of slots is configured as a to accommodate at least one dichroic module and another at least one of the slots in the plurality of slots is configured to accommodate at least one long pass filter module, comprising:

the at least one dichroic module configured with a keyed connection with at least one dichroic module slot in the microscope main body which permits insertion of the at least one dichroic module in only one orientation relative to the microscope main body;

the at least one long past filter module insertable into a slot for the long pass filter module in the microscope main body; and at least one laser source removably connectable to the at least one laser source port of the microscope main body wherein the at least one dichroic module has a configuration such that while inserted in the at least one dichroic module slot the at least one dichroic module is positioned to:

direct, in response to receiving generated LED light from the at least one LED light connected to the at least on LED port, a portion of the generated LED light from the at least one LED module towards and through the first portion of the microscope main body, and direct, in response to receiving generated laser light from the at least one laser source connected to the at least one laser source port, a portion of the generated laser light from the at least one laser source, towards and through the first portion of the microscope main body.

15. The kit of claim 14 wherein the at least one dichroic module comprises a 349-405 nm dichroic mirror, the long pass filter module comprises a 349-405 nm long-pass filter, and the at least one laser comprises a 349-405 nm laser.

16. The kit of claim 14 wherein the at least one dichroic module comprises a 635 nm dichroic mirror, the long pass filter module comprises a 635 nm long-pass filter, and the at least one laser comprises a 635 nm laser.

17. The kit of claim 14 wherein the at least one dichroic module comprises a 940-975 nm dichroic mirror, the long pass filter module comprises a 940-975 nm long-pass filter, and the at least one laser comprises a 940-975 nm laser.

18. The kit of claim 14 wherein the at least one dichroic module comprises a 266 nm dichroic mirror, the long pass filter module comprises a 266 nm long-pass filter, and the at least one laser comprises a 266 nm laser.

\* \* \* \* \*